United States Patent Office 3,236,827
Patented Feb. 22, 1966

3,236,827
INORGANIC CATALYSTS USEFUL IN PRODUCING CIS-1,4 POLYBUTADIENE
Harvey Scott, Philadelphia, Pa., and Roger F. Belt, Parma, Ohio, assignors to Goodrich-Gulf Chemicals, Inc., Cleveland, Ohio, a corporation of Delaware
No Drawing. Filed Aug. 10, 1962, Ser. No. 216,049
8 Claims. (Cl. 260—94.4)

This invention relates to the production of stereoregular diolefin polymers; more particularly, however, this invention relates to the polymerization of monomeric diolefins to form materials having a relatively high cis configuration and to catalysts and processes for carrying out such polymerizations.

Owing to recent discoveries in the field of organometallic type catalysts, it has become possible to polymerize various monomeric substances in uniform stereoregulated configurations. It is now possible, for instance, to produce from monomeric 1,3-butadiene a polymeric product having a relatively high cis-1,4 content. Such material has wide application in many fields, including the manufacture of truck and automobile tires, due to its low hysteresis-high rebound characteristics, good flex-cracking resistance, excellent aging properties and superior tread wear resistance up to double that of natural rubber.

The manufacture of cis-1,4 isomers has been obtained through the use of catalyst compositions containing various transition metals in combination with organometallic compounds, i.e., compounds in which a metal atom, such as aluminum is linked directly to at least one hydrocarbon radical by a metal-carbon bond. From the standpoint of product quality, the use of such catalysts in the preparation of stereoregular polymers from monomeric diolefins is relatively satisfactory; however, it is desirable to avoid employing organometallic constituents in commercial processes, if possible, for the reason that such materials are spontaneously flammable on exposure to air, and their use in the considerable quantities necessitated by large scale manufacturing operations constitutes a potentially hazardous situation. Furthermore, such catalysts have, because of their extremely reactive nature, a propensity to react with certain types of adventitious contaminants, and it is, consequently, difficult to maintain catalytic efficiencies of the materials at a satisfactory high level during use. For the same reason, storage of such substances over prolonged periods tends to be a problem. In view of the foregoing, it can readily be seen that development of a catalyst system capable of producing polymers of the type described which does not require the presence of an organometallic component would be desirable.

Novel methods have recently been found for manufacturing stereoregular diolefin polymers, which make use of catalysts that do not contain organometallic components. These catalysts, and the methods for using them, are fully disclosed in copending application, Serial No. 82,489 of Harvey Scott and Donald A. O'Reilly. The catalysts described in that application utilize various transition metals, and compounds containing them, in catalyst mixtures with certain other necessary ingredients. Through use of the catalysts and processes therein disclosed, polymers having a high cis structure and displaying desirable physical characteristics can be produced. It is frequently desirable in manufacturing processes, however, to be able to use alternative processing ingredients. A method of manufacture having such versatility can avail itself of favorably fluctuating costs of alternative components and, many times, can avoid undesirable dependence on the availability of particular processing materials or the products of particular manufacturers.

Certain methods, contemplated by the invention disclosed herein, have now been discovered by which monomeric diolefins can be polymerized with catalysts which contain no dangerous organometallic components. The process of the invention employs novel metallic catalyst components the use of which in catalysts of the inorganic type has hitherto been unknown. The polydiene polymers resulting from employment of the invention contain a relatively high proportion of the cis type polymer and have a predominately 1,4 type structure. The various components of the catalyst used are easily prepared, and the same are unusually stable, thus permitting storage for relatively long periods prior to use without substantially detracting from catalytic activity. In addition, while the catalysts employed are highly conductive to the formation of valuable, structurally homogeneous, cis type polymers, the components of the catalysts are relatively inexpensive when compared to catalysts of the organometallic type.

In accordance with this invention, a method has been discovered for manufacturing from 1,3-diolefins valuable stereoregulated polymers having a relatively high cis-1,4 structure which comprises polymerizing the monomeric diolefins by contacting the same with a catalyst which includes an aluminum trihalide, a constituent containing an element falling within Group II–A of the Periodic Chart of the elements, chosen from the class which consists of beryllium and magnesium; and a catalyst regulator, until the desired polymerization has been obtained.

The polymerization process of the invention may be carried out in any of various ways. A catalyst capable of polymerizing the diolefin monomers can, for example, be obtained by preparing a solid composition containing both the aluminum trihalide and the Group II–A containing component of the catalyst. Such a composition may subsequently be added to the reaction mixture and brought into contact with a catalyst regulator component, infra, at the latter point. An active catalyst may, however, be formed in situ. This can be accomplished by adding the catalyst components including the aluminum trihalide, the Group II–A metal containing constituent, and the catalyst regulator directly to a solvating reaction mixture so as to form a catalytically active solution. In addition to the preceding methods, a catalyst may, under certain conditions, be prepared in a form of a "catalyst oil" and added in that form to a reaction mixture. The oil may, in those cases where a catalyst regulator is not already present, be combined with one in the reaction mixture. Irrespective of the physical form of the catalyst employed in the process, the catalyst is brought into contact with the monomer to be polymerized, in the presence of an inert polymerization medium if desired, and the reaction is continued until the desired polymer has been obtained. The reaction mixture is then united with a catalyst deactivating agent, thus terminating the polymerization, and the polymeric product is subsequently separated from the reaction mixture, including catalyst residues, and dried.

Although, as previously mentioned, inorganic catalysts are known which have ability to polymerize monomeric 1,3-diolefins in a stereoregular fashion, all such catalysts have required, as an indispensable ingredient, the presence of transition type metals, i.e., metallic elements having an inner "d" level in their atomic structure which is not filled to capacity. It was a considerable surprise, therefore, to discover that certain "representative" elements, elements characterized by having incompletely filled levels of maximum principle quantum number—all underlying levels being filled to capacity, could successfully be employed for the preparation of a non-organometallic type catalyst possessing the desired stereo-directive effect. The ability of certain catalysts forming materials to catalyze particular reactions and the absence of such capability in compounds of the same general type is a phenomenon frequently encountered. Catalyst components selected from specifically different chemical groups are even less likely to resemble each other insofar as their catalyst forming propensities are concerned, and it was, therefore, completely unexpected, prior to the discovery disclosed herein, that substances containing certain ones of the Group II–A elements could be employed to prepare the polymers described.

The nature of the catalysis involved in preparation of the stereoregular polymers by means of the process of the invention is not clearly understood. However, although the invention is not to be considered predicated on the theory, from the experimental evidence it is deduced, at least in some instances, that part of the operative mechanism involves the formation of a relatively unstable complex which includes the aluminum halide and the group II–A metal containing constituent of the catalyst. It is known, for instance, that when certain metal halide solids having a blue color are exposed to aluminum bromide vapors, the gradual formation of a green complex is observed. When the aluminum bromide complex and the same metal halides are melted together, formation of the green complex appears immediately. Furthermore, although benzene is a non-solvent for the metal halides, when the aluminum chlordie and metal halides are added to the benzene medium contemporaneously, solution of the metal halide compounds does occur. It has also been observed that combinations of the components suspected of containing the complex produce an electron paramagnetic resonance signal. The fact that such a signal is observed, by itself, indicates that a complex is involved since the metal halides give a non-observable broad-line spectrum when examined by themselves. An observable signal appears only when the degenerate orbitals of the metal compound are split into higher and lower energy levels through a complexing mechanism.

While the above and additional evidence including X-ray spectra, fractional sublimation and the like seems to indicate formation of a complex between the aluminum halide and group II–A metal containing constituent of the catalyst, the action of the catalyst regulator is not known. Part of the function of the regulator may be to suppress any competing Friedel-Crafts reaction taking place in the polymerization system. However, certan observations strongly suggest that the action of the regulator is not confined to a suppressant role. Irrespective, however, of the precise manner in which the regulator promotes the reaction, the necessity of including such a substance is evidenced by the fact that a polymerization employing the components disclosed herein produces, in the absence of such regulators, a heterogeneous product combined in the unsuitable 1,2 and/or 3,4 structures as well as the desirable 1,4 structures and containing a considerable amount of the undersirable phenylated polymer. Such a polymer possesses properties which are of reduced commercial worth.

The catalyst and process of the invention may be used to polymerize any of a wide variety of unsaturated monomers, however, the system is primarily intended for use in the stereoregulated polymerizations of monomeric polyolefins such as for instance, monomeric 1,3-diolefins, and it has been found to be particularly suited to the formation of substantially all-cis 1,4-polybutadiene. When used in accordance with the procedures disclosed, the process has been successfully used to produce polymeric materials of desirably high molecular weight, and polymers having over 85% in many cases in excess of 90%, of the cis-structure containing less than 5% of the many times undesirable 1,2 polymer, can readily be obtained.

The catalyst components found necessary for successfully practicing the process of the invention include an aluminum halide; a group II–A metal constituent, i.e., a substance containing either beryllium or magnesium; and a catalyst regulator. The aluminum compound required for preparation of the catalyst can be any inorganic aluminum halide compound having Friedel-Crafts activity, i.e., activity in Friedel-Crafts reactions and/or the ability to induce heterogenous polymerization of 1,3-diolefins and may be selected from many different halogen-aluminum compounds. The use of compounds having an appreciable solubility in the reaction mixture, however, is to be preferred over those having only slight solubility in the mixture. Suitable aluminum halides can be found, for example, among compounds containing aluminum in combination with a particular halogen or in compounds containing aluminum combined with more than one kind of halogen, that is mixtures of halogens can be employed.

Operative compounds include substances such as for example, aluminum trichloride, aluminum tribromide, aluminum triiodide, complex aluminum halides such as aluminum fluorodiiodide, aluminum iododichloride, aluminum bromodichloride, aluminum chlorodifluoride, aluminum diodobromide, aluminum dibromoiodide and mixtures of any of the preceding as well as other aluminum halide compounds. Particularly effective polymerization however, have been conducted when the aluminum halide compound included in the catalyst mixture is either aluminum trichloride or aluminum tribromide.

Certain group II–A—as the group is shown by the Mendeleeff Periodic Table which appears in Lange's Handbook of Chemistry, 9th edition, page 56—metal containing substances including magnesium containing substances and substances containing beryllium have been found to have the ability, when combined with the other catalyst components disclosed herein, to polymerize the diolefins contemplated by the invention in a stereoregulated fashion. Among the magnesium compounds found adapted to use in the invention are any of various magnesium containing substances including, but not limited to magnesium hydroxides, magnesium compounds formed from organic and inorganic acids, materials such as, for example, magnesium halides, magnesium oxides, magnesium metal, complexes containing magnesium as well as numerous additional salts and other types of compounds containing magnesium. While the list is not to be construed as comprehensive, any substance such as magnesium chloride, magnesium bromide, magnesium iodide, magnesium oxide, magnesium hydroxide and the like may all be employed. Certain advantages reside, however, in the use of magnesuim halides, particularly in the chloride, and the use of such compounds is preferred.

Likewise, when beryllium is to be employed for forming the catalyst, any of a great variety of substances including beryllium halides, oxides, hydroxides, salts of organic as well as inorganic acids and complexes containing berryllium may be chosen for the purpose. Although beryllium compounds such as beryllium chloride, berylium iodide, and various other halo-beryllium compounds are preferred, beryllium oxides, beryllium hydroxide, beryllium stearate, beryllium sulphate and other, additional beryllium compounds are also suitable. In view of their toxic nature, care should be exercised in the handling of beryllium containing substances.

When employed for catalytic purposes in the process, it is preferred that the group II–A metal constituent be in a substantially anhydrous form. Since any water which is present may be eliminated either during preparation of the catalyst or in the reaction mixture, it is not to be inferred, however, that completely anhydrous ingredients must be used to perpare the catalyst formulation. Water elimination may occur, for instance, when the catalyst is prepared from a fusion of the catalyst components. Substantially all of the water present in the components is driven off during such a fusion and is, consequently, no longer available for interfering with the polymerization reaction. Furthermore, in those polymerizations carried out in the presence of an excess of aluminum trihalide, any water contained by the system is eliminated through reaction with the aluminum compound, sufficient active halide remaining behind in such cases to catalyze the polymerization. Anhydrous compounds of magnesium and beryllium may readily be prepared by gently heating the components, in the presence of a reduced atmosphere if desired, thereby driving off the combined water or, alternatively, by combining the water containing compounds with a suitable azeotrope forming hydrocarbon and distilling off the water containing azeotrope until the materials are substantially dehydrated. The addition of a small amount of a proton-accepting metal such as, for example, aluminum to the catalyst forming materials, even in the case of the non-oil catalysts, has been found to be of advantage. Among other things, such a material can accomplish removal of traces of acid which may result from the reaction of water with certain of the catalyst components.

A catalyst system consisting of an aluminum trihalide and a substance containing either magnesium or beryllium can, by itself, be used to catalyze a polymerization reaction of unsaturated monomeric materials. It has been found however, that unless such a catalyst mixture contains what is, for the purposes of the invention, termed a catalyst "regulator," a polymerization capable of yielding a significant portion of a particular stereoisomer such as the cis polymer, predominating in the 1,4 type structure and containing only a minimal amount of phenylated polymer—the type of polymer produced by this invention—cannot be achieved. It is for this reason that such a regulator is included as an integral part of the catalyst system of the invention. While, as previously indicated, the precise nature of the action of catalyst regulators on the catalytic system is not fully understood, various materials have been discovered which will produce the desired effect.

Among the substances which have thus been found to produce the stereo-directive effect are thiophene compounds. It is to be understood that the designation "thiophene compound" is not restricted herein to mean thiophene alone. The term comprehends additional thiophene compounds including vinyl thiophene as well as other substituted thiophene compounds.

Also found satisfactory for the purpose of creating a catalyst system capable of producing stereoregular polydiolefin products are various amine compounds. The amine regulators when used in a system containing various aliphatic hydrocarbons including compounds such as for instance, butene-1, pentene-1, hexene-1 and the like, in combination with an aromatic compound, for example benzene, are particularly effective for such use. Such a system may conveniently be adjusted from the point at which the solvent is substantially all aromatic, i.e., benzene, to the place where the solvent mixture contains only about 5% by weight of the aromatic, the balance being of the unsaturated type. Although many different types of amines are suitable for the purpose, aliphatic amines and, in particular, trialkyl amines have proven to be particularly useful in the practice of the invention. Illustrative amines include compounds such as, for example, triethyl amine, tri-n-butyl amine, trihexyl amine, tri-2-ethylhexyl amine, tridecyl amine, but others, of course, are equally useful. While the amines are included primarily for the purpose of obtaining the desired directive effect, such materials also serve to enhance the solubilizing characteristics of the reaction medium and are desirable catalyst components for that reason also.

Still another catalyst regulator system which when employed with the other catalyst components of the invention has the ability, through the formation of a catalytically active "oil," to produce a stereospecific polymerization, consisting of an aromatic hydrocarbon in conjunction with a proton-accepting metal. When employed for this purpose, any of the aromatic-type compounds produce a satisfactory "oil" type regulator; however, substituted aromatics have been found to produce superior results, and the use of such compounds is preferred. Examples of effective substances include compounds such as benzene, toluene, xylene, and various other aromatic and alkylated aromatic materials. Any metal preferably in a finely divided form, which has a proton-accepting ability is suitable for combination with the aromatic constituent to form the catalyst regulation system. Among those materials which have been found to be particularly useful, are finely divided aluminum, magnesium and similar substances. The addition of relatively small amounts of the proton-acceptor to the aromatic substance is all that is required to produce an efficient catalyst regulator.

While the polymerization process may be carried out in its absence, the use of a reaction-solubilizing, inert polymerization medium provides certain advantages in carrying out the polymerization process, and its use is desirable. Numerous compounds including aliphatics, both saturated and unsaturated; aromatics; substituted aromatics and similar substances, as well as mixtures of them, are satisfactory for the purpose. Reaction mediums having an appreciable solubilizing effect on the components of the polymerization are to be preferred over materials having only a slight solubilizing effect, and aromatic compounds such as benzene have been found to be particularly adapted to the purpose. The use of at least 5% by weight of the latter material, based on the total amount of polymerization medium, is employed in the preferred embodiment of the invention. Among additional media suited to such use may be mentioned solubilizing compounds and mixtures containing such materials as toluene, butene, cyclohexane, pentane, and the like.

Considerable latitude may be exercised by the practitioner in preparing the stereo-directive catalysts of the invention. One method which has thus been found convenient consists of initially preparing a solid composition containing both the aluminum halide and the group II-A metal containing component and subsequently adding the solid composition to the catalyst regulator in order to form the active catalyst system. An advantage in this type of operation is found in the fact that such solid compositions may be stored for long periods in a substantially dry, preferably inert atmosphere prior to their use in polymerization reactions. Such compositions may be prepared in any of several ways. The aluminum halide and the group II-A metal containing component may, for instance, simply be mixed together and utilized in that form. However, the components can also be fused, through the application of sufficient heat, to form the catalyst forming additive. Although not required, when the catalyst is prepared in a fused form, subsequent attrition into particles of reduced size enables the solid material to be rapidly incorporated into the catalyst system. Still another method for preparing the solid composition consists of heating one of the metal components to its vaporization temperature and condensing its vapors onto the other component. The procedure results in chemisorption of the vaporized material by the solid component and produces the desired composition. Instead of preparing a solid composition as the first operation in a multi-step catalyst preparation procedure, however, a catalyst system capable of efficient conversion of the diolefin monomers to the stereoregular polymers contemplated by the invention, can be prepared more directly. This may be done by adding the individual catalyst components including the aluminum halide and the group II-A metal containing component directly to a catalyst-solubilizing inert hydrocarbon, which may also serve as the polymerization medium. The mixture may be agitated and heated gently, if desired, to obtain accelerated solution of the ingredients. Following formation of the catalyst solution, the catalyst regulator is added to the system and polymerization commenced through the introduction of monomer.

A suitable catalyst may also be obtained through the formation of a catalytically active "oil." The oil form of the catalyst is produced by combining and heating the aluminum halide and group II–A metal containing components with an aromatic hydrocarbon. When the mixture is heated beyond the time during which the solid ingredients pass into solution, a separate liquid phase having a definite oily appearance is gradually produced and settles out on the bottom of the vessel. Although, when the aromatic compound employed is of the alkylated type such as xylene, toluene, and the like, formation of the oil—where the group II–A consitutent is a magnesium containing substance—is readily obtained, the addition of a proton accepting metal facilitates the rapid formation and separation of the oil phase. In those instances where an aromatic substance such as benzene is used, the addition of a proton-accepting metal is usually required to produce the desired oil. Formation of the oil-type catalysts is somewhat more difficult when the group II–A metal consituent selected for the purpose is a beryllium containing substance, and in such cases, it is sometimes necessary to employ more than the amount of the aluminum halide usually required to produce the oil. Following its preparation, the oil-type catalyst is added to the reaction mixture, and the catalyst regulator is introduced to produce the active catalyst system. In the case of oils formed in the presence of the proton-accepting metals, however, no other catalyst regulator is required since the presence of the proton-accepting metal in combination with the aromatic hydrocarbon constitutes a satisfactory catalyst regulator, supra.

The amount of catalyst required for successfully practicing the process of the invention depends upon the type of polymeric product sought, the polymerization conditions under which the reaction is to be conducted and similar factors. In any event, the amount of catalyst required is not particularly critical and may be varied within a relatively wide range. In carrying out polymerizations of the type described, it has been observed that the greater the amount of catalyst included in the reaction mixture, the lower will be the molecular weight of the polymeric product and conversely. The choice of the quantity of catalyst used, therefore, will depend in part upon the molecular weight of the polymer which it is proposed to obtain. In addition, certain materials which are sometimes adventitiously present in the processing equipment have the capability of inactivating various of the catalyst components. In this connection, attention is directed to the previously mentioned interaction of water with the aluminum halide constituent of the catalyst. It is desirable to add an additional amount of catalyst over that theoretically required, therefore, to compensate for inactivation of the catalyst brought about by the presence of the aforementioned impurities. Within the foregoing general considerations, the addition of an amount of catalyst such that at least about 1 mole of aluminum halide is present for every 300 moles of monomer will produce the desired polymerization, and although more may be used, employment of about 1 mole of aluminum halide for every 50 moles of monomer represents the upper range of material normally added to the reaction. The use of about 1 mole of aluminum halide for about every 100 to 200 moles of monomer has been found to produce particularly advantageous results, and the use of such amounts is preferred.

While the exact nature of the catalytically active combination of the aluminum halide with the Group II–A metal constituent is not fully understood, the evidence tends to indicate formation of complex containing at least 2 molecules of aluminum halide for each mole of Group II–A constituent present. While it is preferred, therefore, that the metal containing ingredients be added in relative amounts such that the molar ratio of the aluminum halide to Group II–A constituent is at least about 2:1 and although greater advantages have been found in the use of a range of from at least about 2:1 to about 10:1, the addition of components in quantities other than those required to constitute the above indicated ratios will not defeat the desired effect. An excess of the Group II–A ingredient added over the amount necessary to complex the aluminum halide is substantially insoluble in the catalyst system, and therefore, inactive in the reaction, while the aluminum halide not required for formation of the catalyst apparently does not prevent formation of stereoregulated polymers.

As in the case of the other catalyst components, the amount of regulator required by the process for the production of the more valuable stereoregulated polymers can be adjusted within relatively broad limits. The specific amounts of regular desirable for the purpose depend, as it is to be expected, on different variables of the polymerization system including such things as, for example, the quantities of other catalyst components used. The choice of a suitable amount will be determined, therefore, at least in part, on the character of the system in which the regulator is to be employed. In those cases where experience has shown one particular level to be unsatisfactory for producing the desired polymers, the level of regulator may easily be adjusted until the product sought has been obtained. In most systems, however, where a thiophene compound is employed as the catalyst regulator, incorporation of at least about 0.5 mole of thiophene compound for every mole of aluminum halide present has been found to be desirable, and a preferred regulation system consists in the addition of at least about 0.5 mole to 3 moles, or higher, of the thiophene compound for every mole of aluminum halide present.

In those cases where an amine is employed to produce the regulative effect, the addition of about 0.5 mole to about 3 moles of the amine compound for every mole of aluminum halide present is satisfactory for the purpose. Superior results can be produced, however, where the amount of amine added amounts to from about 1 to 2 moles of the amine for every mole of aluminum compound used.

Where catalyst regulation is provided for by a system consisting of an aromatic hydrocarbon in conjunction with a proton-accepting metal, i.e., in the oil forms of the catalyst, a relatively small amount, for example, as little as about 0.01 gram, of the proton-accepting metal is all that is required to obtain a satisfactory directive effect. In the preferred embodiment of the invention, however, at least about 0.1 gram of the proton-accepting metal is employed for every gram mole weight of aluminum halide present in the catalyst.

Although the use of an inert polymerization medium is not mandatory in practicing the invention, employment of such material provides a convenient method by which control of the polymerization reaction may be obtained. For this and other reasons, therefore, the use of such a material is preferred. In those variations of the process in which a polymerization medium is employed, the addition of such medium in an amount constituting, on a volume basis, from about 0.5 to 20 times the amount of monomer present comprises a conveniently workable system. When the reactor equipment includes a reflux-type condenser, condensation and subsequent return of polymerization medium to the reactor assists in providing temperature control of the exothermic reaction.

In marked contrast to many other types of chemical reactions in which factors such as temperatures, pressures and the like play a major role in the course of the reaction, the process of the invention is not overly sensitive to the conditions under which the polymerization is conducted. Thus, any within a wide range of temperatures may be selected for carrying out the process. Although temperature control in an area of no more than about 100° C. enables the polymerization to proceed with particular efficiency to produce the desired product, polymerizations conducted within a temperature range of from about −30° C. to little more than about 60° C. have been found to be even more advantageous with respect to producing uniformly stereoregulated polymers. Consequently, employment of reaction temperatures within the latter limits is preferred.

The pressure conditions under which the polymerization is performed are not critical, and reduced as well as pressures greater than atmospheric can be employed. For reasons of convenience, however, maintenance of atmospheric or autogenous pressure conditions is desirable.

Although practitioners of the invention have considerable freedom in selecting the type of atmosphere under which the reaction is to be performed, and while the reaction is apparently not as sensitive to the presence of oxygen as in the case of catalyst systems employing organometallic components, the reaction does employ organic solvents of the types previously described, and for this and other reasons, the use of an inert atmosphere such as argon, nitrogen, helium, hydrocarbon vapor or the like is advisable. Since certain of the catalyst components are sensitive to the presence of water, supra, the system should be insulated insofar as is possible from contact with water or water vapor. Unless proper care is exercised, water can enter the system through the use of contaminated reaction ingredients, improperly maintained processing equipment and in similar ways.

The time required for the polymerization reaction to reach the desired point will, of course, depend upon the conversion of monomer which it is desired to achieve and various other factors such as the relative, as well as absolute amounts of reaction ingredients present, the conditions under which the polymerization is carried out and the processing equipment employed. Generally speaking, however, polymerization of monomeric 1,3-butadiene to substantially all cis-1,4 polymeric product can be accomplished in no more than about 40 hours, and usually satisfactory polymerizations can be obtained in less than about 24 hours.

The polymerization reaction may be carried out by means of a batch process as, for instance, by combining the reaction ingredients in a clean, substantially dry reaction vessel, advantageously maintained under an inert atmosphere. Although various orders of addition may be utilized, it is preferred that the catalyst regulator be present in the reaction mixture when the monomer is added in order that the formation of undesirable heterogeneous polymer can be avoided. In additon, when a thiophene compound is to be used as the regulator, it is desirable that the monomer be added to the reaction mixture as soon as practicable following addition of the thiophene so that little or no polymerization of the latter material, either with itself or with the other catalyst components, occurs. Introduction of the monomer within a few minutes after addition of the thiophene compound is preferred, and particularly desirable results in this respect are obtained when the monomer is added within a minute or less following incorporation of the thiophene compound.

A batch technique, one variation of which has been described above, provides a method by which a high quality product can be made; however, the use of a continuous process is sometimes desirable. A continuous process can be realized by providing for the continual addition to the reaction vessel of polymerization ingredients such as monomer, a polymerization medium if one is to be used, and the catalyst components, including regulator, as well as for the constant removal of the polymerization mixture for the purpose of catalyst deactivation, polymer separation, and subsequent product purification.

After the polymerization has proceeded to the desired point, the reaction may be arrested by deactivating the catalyst in the polymerization mixture. Deactivation may be accomplished by introducing into the mixture substances such as, for example, alcohol, water, acetone, acetic acid, or various other materials which contain active hydrogen ions. Although water is admirably suited to the purpose inasmuch as it is inexpensive and easily handled, organic substances containing active hydrogen ions are particularly suited to the purpose since they are usually completely miscible with the reaction mixture and are capable of rapid deactivation of the catalyst. In terminating the polymerization reaction, the deactivating materials may be added directly to the reaction mixture, or the mixture itself may be dispersed in the water or other catalyst deactivating substance. When the polymeric product is substantially insoluble and the polymerization medium substantially soluble in the deactivation agent, termination of the polymerization can, when a sufficient amount of agent is employed, also accomplish precipitation of the polymer from the reaction mixture. Following production of the polymer in a separable form either through addition of the reaction mixture to a substance having only a limited solubility for the polymer, or by other means, the polymer is separated and treated by washing or otherwise to remove traces of the inactivated catalyst, and then dried. Polybutadiene rubbers containing a high proportion of cis-1,4 material are stable substances and can be dried at temperatures up to 250° F. or higher. The drying of the polymers may be carried out in a variety of equipment such as hot-air driers, vacuum driers, extruder driers and various other similar devices.

It is frequently desirable to incorporate antioxidants or other compounding materials with the polymeric product. This may readily be accomplished by introducing such materials into the reaction mixture either prior to, or following precipitation of the polymer. Antioxidants of the type commonly used in natural or styrene-butadiene rubbers are admirably suited to the protection of the polymer, and the addition of such materials in relatively minor amounts adequately stabilizes the polymer during operations such as drying, processing, storage and shipment.

The following examples, while not intended to be limiting in nature, are illustrative of the invention.

*Example I*

In this example, a catalyst "premix" composition is prepared by combining 0.93 gram of aluminum chloride with 0.22 gram of magnesium chloride. The premix is subsequently added in a substantially dry nitrogen atmosphere to an 8 oz. polymerization bottle containing 90 grams of benzene, and the bottle is stoppered with a self-sealing cap. The contents of the bottle are gently heated and agitated—until solution of the solids is substantially complete, before the reaction is initiated, following addition of 0.39 gram of thiophene, by introducing approximately 5 grams of 1,3-butadiene into the mixture. Both the thiophene and monomer are added through the self-sealing cap of the polymerization bottle by means of a hypodermic syringe. Polymerization commences almost immediately following the addition of monomer and is permitted to continue for a period of about 20 hours, during which time the bottle is suspended in a constant temperature bath maintained at 30° C. At the conclusion of such period, the reaction is terminated by adding 5 milliliters of methanol to the reaction mixture with the syringe. The bottle is then uncapped and its contents poured into an equal volume of methanol, thereby precipitating the polymeric product from solution. Following precipitation, the polymer is separated from the methanol and dried in a vacuum oven at 50° C. to produce 0.5 gram of polymer which analysis shows to contain 85% of the cis-1,4 type polymer.

*Example II*

In another example, a mixture containing 0.67 gram of aluminum chloride and 0.14 gram of magnesium chloride is heated until the materials become fused. The fused product, maintained in a substantially dry atmosphere until use, is subsequently placed in a polymerization bottle containing 90 grams of specially dried benzene, i.e., dried through contact with molecular sieve adsorbent. The contents of the bottle, which are maintained under a substantially dry nitrogen atmosphere, are agitated at a temperature of 30° C. until substantial solution of the mixture has been obtained. Following the solution step, 0.39 gram of vinyl thiophene is added to the reaction mixture through the self-sealing cap by means of a hypodermic syringe, and 5 grams of 1,3-butadiene are added immediately thereafter, also by means of the syringe. Following the introduction of the monomer, the bottle is placed in a constant temperature bath adjusted to 30° C., and the polymerization is permitted to proceed for about 21 hours before being shortstopped by the addition of a small amount of methanol. The autogenous pressure is then carefully released, and the mixture is emptied into, and worked-up in additional methanol before being dried in the manner of Example I. The procedure results in 0.2 gram of a product containing 86% of the cis-1,4 polybutadiene.

A similar experiment in which, however, the fused premix has been stored for 6 weeks prior to use produces substantially the same results.

*Example III*

An additional experiment is carried out as follows: 1.4 grams of aluminum bromide is added to 85 grams of benzene contained in an 8 oz. polymerization bottle, the latter being maintained in a dry nitrogen atmosphere, and 0.14 gram of magnesium chloride is added thereafter. The bottle is then capped with a self-sealing cap, and the contents are dissolved by simultaneously agitating and heating, to approximately 30° C., the contents of the bottle. After the solid ingredients have been substantially dissolved, 0.78 gram of thiophene and 6 grams of 1,3-butadiene are added in the order shown to begin the polymerization. The reaction is carried out in a 30° C. constant temperature bath for 24 hours prior to reaction termination, and work-up is carried out in the manner of the first two examples. The product obtained is dried in a vacuum oven at 50° C., thereby producing 0.1 gram of a polybutadiene polymer which upon analysis is shown to possess an 85% cis-1,4 composition.

*Example IV*

In still another experiment, a catalyst premix fusion containing 1.35 grams of aluminum bromide and 0.15 gram of magnesium chloride is added to a polymerization bottle, maintained under a substantially dry nitrogen atmosphere, which contains 5 grams of benzene and 75 grams of butene-1. Following solution of the solid ingredients, 0.30 gram of tri-n-butyl amine and 6 grams of 1,3-butadiene are added to the bottle in that order. After reaction for 15 hours at 5° C., the reaction mixture is inactivated by the addition of 5 milliliters of acetone, and the contents of the bottle are worked-up in methanol in the ordinary manner. Approximately 0.2 gram of 88% cis-1,4 polybutadiene is thus obtained.

*Example V*

In this example, a solid mixture is prepared from 0.54 gram of aluminum chloride and 0.15 gram of beryllium chloride. The mixture is subsequently introduced into a polymerization bottle containing 90 grams of specially dried benzene, and solution of the ingredients is accomplished in a dry nitrogen atmosphere. Approximately 0.32 gram of thiophene is then introduced into the bottle with a hypodermic syringe, and the reaction is commenced by adding immediately thereafter 9 grams of 1,3-butadiene. Polymerization is allowed to continue for a period of about 20 hours before the catalyst is destroyed with methanol and the polymer worked-up in a methanol solution and dried as set forth in Example I. The polymer recovered by this procedure, 1 gram in all, is shown to possess 90% of the cis-1,4 type polymer. Such a product because of its substantial cis content displays improved elastomeric properties and is a valuable article of commerce.

*Example VI*

In this example, 1.1 grams of aluminum bromide is added, under a dry nitrogen atmosphere, to an 8 oz. polymerization bottle which contains 10 grams of benzene and 80 grams of butene-1. Following addition of 0.22 gram of metallic beryllium, the bottle is capped, and substantial solution of the ingredients is obtained by gentle heating and agitation. In view of their toxic nature, considerable caution is observed in handling all beryllium containing materials. Approximately 0.38 gram of tri-n-butyl amine is added to the polymerization bottle and 5 grams of 1,3-butadiene is thereafter introduced to begin the reaction. Following addition of the last ingredient, the bottle is placed in a 50° C. constant temperature bath for a period of 24 hours. At the end of this time, the reaction is terminated by the addition of 5 milliliters of methanol; the bottle is cautiously uncapped, and its contents are discharged into an equal volume of methanol to secure precipitation of the polymer. The precipitate is thereafter separated and dried in a vacuum oven maintained at 50° C. About 0.7 gram of a rubbery polymeric product, shown by analysis to possess 94% of the cis-1,4 structure, is obtained in this manner. Because of its relatively high cis content, the material is suitable for many uses to which natural rubber is commonly put; however, due to its improved abrasion and tensile properties, the synthetic material can be employed in many places unsuited to use of the natural product.

*Example VII*

An experiment is performed in which 13.3 grams of aluminum chloride, 4.7 grams of magnesium chloride and 0.1 gram of powdered aluminum are heated in 100 grams of benzene, at 50° C., for a period of about 8 hours. As the heating proceeds, an oily phase forms and collects on the bottom of the vessel. Following formation of the oil, the mother liquor is decanted from the container and replaced with an equal volume of benzene. The resulting composition is transferred to an 8 oz. polymerization bottle, all procedures being carried out in the presence of a dry nitrogen atmosphere, and the polymerization is commenced by the addition of 10 grams of 1,3-butadiene. The reaction is continued for 18 hours in a 30° C. constant temperature bath. At the end of the polymerization period, the reaction is terminated by the addition of a small amount of methanol, and the polymer is worked-up in the manner of Example I. About 0.2 gram of a product which is found to have a 95% of the cis-1,4 structure is produced in this fashion.

*Example VIII*

An additional experiment is performed in which 0.55 grams of aluminum chloride, 0.22 gram of beryllium chloride and 0.05 gram of aluminum powder is added to 80 grams of benzene, and the mixture is heated in a nitrogen protected vessel at 50° C. for about 15 hours. The oil phase which is formed and deposited on the bottom of the vessel is separated from the supernatant liquid by decanting the latter. The separated liquor is replaced with an equal volume of specially dried benzene, and the resulting composition is transferred to an 8 oz. polymerization bottle, the latter also being protected with a dry nitrogen atmosphere. The bottle is subsequently capped, and 5 grams of 1,3-butadiene are added through the self-sealing cap by means of a hypodermic syringe. The polymerization reaction, which begins almost immediately following addition of the monomer, is continued for about 24 hours in a 30° C. constant temperature bath. Almost 0.5 gram of a 95% cis-1,4 polybutadiene product is obtained following catalyst inactivation, product work-up, and drying—all of which are carried out in the manner previously described in Example I.

What is claimed is:

1. A process for producing a polybutadiene product characterized by at least about eighty-five percent cis-1,4 addition comprising polymerizing at a temperature below about 100° C. monomeric 1,3-butadiene in an inert polymerization medium, with a catalyst composition comprised of an aluminum trihalide; a group II–A metal containing component selected from the group consisting of beryllium metal, beryllium or magnesium hydroxides, beryllium or magnesium oxides and salts formed with organic or inorganic acids; and a catalyst regulator component selected from the group consisting of thiophene, aliphatic hydrocarbon substituted thiophene, aliphatic amines, and an aromatic hydrocarbon in combination with aluminum metal, the components of said catalyst being present in a ratio such that, on a molar basis, the aluminum trihalide constitutes at least about twice the amount of the group II–A metal halide, but no more than about twice the moles of any of thiophene, aliphatic hydrocarbon substituted thiophene and aliphatic amines employed, and when present, at least about 0.01 gram of aluminum metal is employed for every gram mole weight of aluminum trihalide used, and at least about one mole of aluminum trihalide is present for every 300 moles of said 1,3-butadiene, until the desired polymerization is obtained.

2. A process according to claim 1 in which the catalyst regulator component is an aliphatic amine.

3. A process according to claim 1 in which the catalyst regulator component is an aromatic hydrocarbon in combination with aluminum metal.

4. A process for producing a polymeric product characterized by at least about eighty-five percent cis-1,4 addition comprising polymerizing at a temperature below about 100° C. 1,3-butadiene with a catalyst composition comprised of an aluminum trihalide; a group II–A metal containing component selected from the group consisting of beryllium metal, beryllium or magnesium hydroxides, beryllium or magnesium oxides and salts formed with organic or inorganic acids; and a thiophene compound regulator component selected from the group consisting of thiophene and aliphatic hydrocarbon substituted thiophene, the components of said catalyst being present in amount such that, on a molar basis, the aluminum trihalide constitutes at least about twice the amount of the group II–A metal containing component, and the thiophene compound regulator component amounts to at least about half the quantity of aluminum trihalide present.

5. A process according to claim 4 in which the group II–A metal containing component is selected from the group consisting of magnesium hydroxide, oxide and magnesium compounds formed with organic and inorganic acids.

6. A process according to claim 5 in which at least about 1 mole of aluminum trihalide is employed for every 300 moles of said 1,3-diene present.

7. A process for producing a polybutadiene product characterized by at least about eighty-five percent cis-1,4 addition comprising polymerizing at a temperature below about 100° C. monomeric 1,3-butadiene in an inert polymerization medium, with a catalyst composition comprised of an aluminum trihalide; a halide of a group II–A metal containing component selected from the group consisting of magnesium halides and beryllium halides; and a catalyst regulator component selected from the group consisting of thiophene, aliphatic hydrocarbon substituted thiophene, aliphatic amines, and an aromatic hydrocarbon in combination with aluminum metal, the components of said catalyst being present in a ratio such that, on a molar basis, the aluminum trihalide constitutes at least about twice the amount of the grup II–A metal halide, but no more than about twice the moles of any of thiophene, aliphatic hydrocarbon substituted thiophene and aliphatic amines employed, and when present, at least about 0.01 gram of aluminum metal is employed for every gram mole weight of aluminum trihalide used, and at least about one mole of aluminum trihalide is present for every 300 moles of said 1,3-butadiene, until the desired polymer is obtained.

8. A process for producing a polymeric butadiene product characterized by at least about eighty-five percent cis-1,4 addition comprising polymerzing monomeric 1,3-butadiene in a substantially dry, inert atmosphere, at a temperature of no more than about 100° C. and in the presence of a reaction-solubilizing, inert hydrocarbon polymerization medium, with a catalyst composition comprised of an aluminum trihalide; a group II–A metal containing component selected from the group consisting of beryllium metal, beryllium or magnesium oxides, beryllium or magnesium hydroxides and salts formed with organic or inorganic acids; and a thiophene compound selected from the group consisting of thiophene and aliphatic hydrocarbon substituted thiophene, the components of said catalyst being present in a ratio such that, on a molar basis, the aluminum trihalide constitutes at least about twice the amount of the group II–A metal containing component, but no more than about twice the amount of the thiophene compound employed, and at least on mole of aluminum trihalide is present for every 300 moles of said 1,3-butadiene used.

References Cited by the Examiner

UNITED STATES PATENTS

| 2,082,500 | 6/1937 | Kuentzel | 260—683.15 |
| 2,085,535 | 6/1937 | Lengedi et al. | 260—94.2 |
| 2,899,415 | 8/1959 | Truett | 260—94.9 |
| 2,915,516 | 12/1959 | Juveland et al. | 260—94.9 |
| 3,049,526 | 8/1962 | D'Alelio | 260—94.3 |
| 3,054,787 | 9/1962 | D'Alelio | 260—94.3 |

FOREIGN PATENTS 340,474  12/1930  Great Britain.

JOSEPH L. SCHOFER, Primary Examiner.

E. J. SMITH, Assistant Examiner.